United States Patent
Droste et al.

(10) Patent No.: US 11,415,855 B2
(45) Date of Patent: Aug. 16, 2022

(54) LAMINATED PANE ARRANGEMENTS HAVING AN ELECTRO-OPTICAL FUNCTIONAL ELEMENT

(71) Applicant: SAINT-GOBAIN GLASS FRANCE, Courbevoie (FR)

(72) Inventors: Stefan Droste, Herzogenrath (DE); Florian Manz, Aachen (DE); Marcel Klein, Baesweiler (DE); Bastian Klauss, Herzogenrath (DE); Michael Zeiss, Heinsberg-Haaren (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/424,773

(22) PCT Filed: Jan. 20, 2020

(86) PCT No.: PCT/EP2020/051221
§ 371 (c)(1),
(2) Date: Jul. 21, 2021

(87) PCT Pub. No.: WO2020/152075
PCT Pub. Date: Jul. 30, 2020

(65) Prior Publication Data
US 2022/0100011 A1    Mar. 31, 2022

(30) Foreign Application Priority Data
Jan. 22, 2019   (EP) .................................... 19152938

(51) Int. Cl.
*G02F 1/1343*   (2006.01)
*G02F 1/1333*   (2006.01)
(Continued)

(52) U.S. Cl.
CPC .............. *G02F 1/137* (2013.01); *B60J 1/001* (2013.01); *G02F 1/1334* (2013.01);
(Continued)

(58) Field of Classification Search
CPC .... G02F 1/133; G02F 1/13306; G02F 1/1333; G02F 1/133305; G02F 1/133345;
(Continued)

(56) References Cited

U.S. PATENT DOCUMENTS 5,124,833 A    6/1992  Barton et al.

FOREIGN PATENT DOCUMENTS

DE         41 21 385 A1    1/1993
DE    10 2005 007427 A1    8/2006
(Continued)

OTHER PUBLICATIONS

International Search Report as issued in International Patent Application No. PCT/EP2020/051221, dated Mar. 26, 2020.

*Primary Examiner* — Thoi V Duong
(74) *Attorney, Agent, or Firm* — Pillsbury Winthrop Shaw Pittman LLP

(57) ABSTRACT

A laminated pane arrangement has a functional element based on liquid crystals, wherein the optical properties of the functional element and an electrical resistance heater of at least one flat electrode are controlled by two different AC voltages. In accordance with a first aspect, the functional element is contacted on two opposite sides by the AC voltages. The AC voltages differ in maximum amplitude, but have the same frequency. In accordance with a second aspect, the functional element is controlled by an AC voltage. At least one flat electrode is heated by an additional AC voltage of greater frequency. A fault in the control of the optical properties of the functional element is prevented by high-pass filters.

17 Claims, 6 Drawing Sheets

Figure 1:
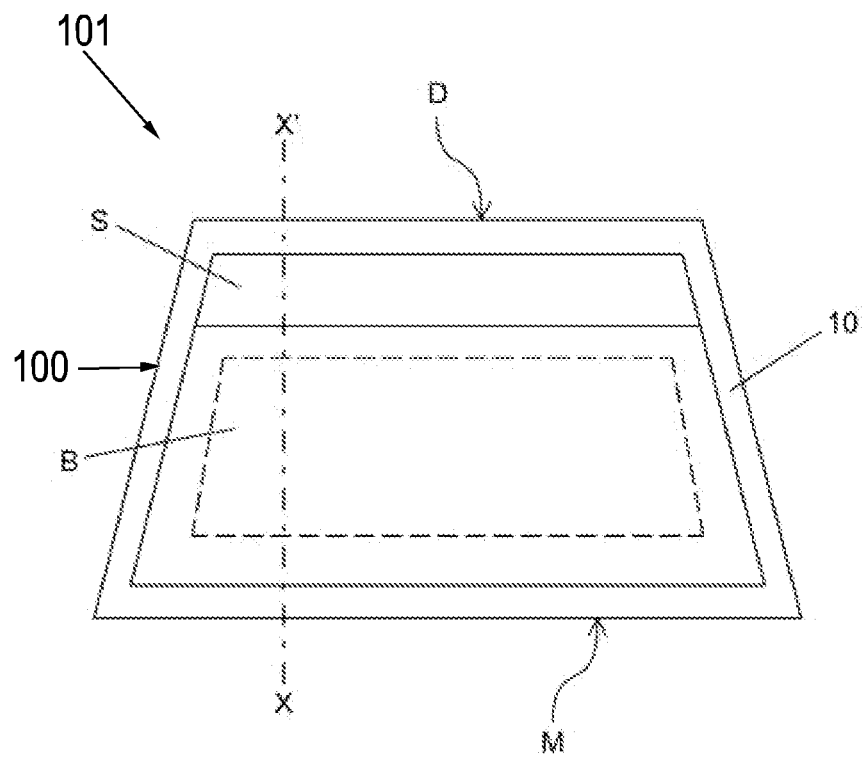

(51) Int. Cl.
*G02F 1/1335* (2006.01)
*G02F 1/137* (2006.01)
*B60J 1/00* (2006.01)
*G02F 1/133* (2006.01)
*G02F 1/1334* (2006.01)
*G02F 1/1345* (2006.01)

(52) U.S. Cl.
CPC ...... *G02F 1/13306* (2013.01); *G02F 1/13439* (2013.01); *G02F 1/13452* (2013.01); *G02F 1/133305* (2013.01); *G02F 1/133382* (2013.01); *G02F 1/134309* (2013.01); *G02F 2203/01* (2013.01)

(58) Field of Classification Search
CPC ......... G02F 1/133362; G02F 1/133365; G02F 1/133382; G02F 1/1334; G02F 1/1335; G02F 1/1343; G02F 1/134309; G02F 1/13439; G02F 1/13452; G02F 1/137; G02F 2203/01; B32B 17/10504; B32B 17/10036; B32B 17/10211; B32B 2457/202; B32B 2605/08; B60J 1/001; C09K 19/02; C09K 19/544; H05B 3/86
See application file for complete search history.

(56) References Cited

FOREIGN PATENT DOCUMENTS

| | | | |
|---|---|---|---|
| DE | 10 2005 049081 B3 | 6/2007 | |
| DE | 10 2007 027296 A1 | 12/2008 | |
| DE | 10 2008 026339 A1 | 12/2009 | |
| DE | 10 2010 048097 A1 | 4/2012 | |
| DE | 10 2013 001334 A1 | 7/2014 | |
| EP | 0 876 608 B1 | 4/2002 | |
| GB | 1 536 568 A | 12/1978 | |
| WO | WO 2011/033313 A1 | 3/2011 | |
| WO | WO 2017/157626 | * 9/2017 | ................ B60J 3/04 |

* cited by examiner

LAMINATED PANE ARRANGEMENTS HAVING AN ELECTRO-OPTICAL FUNCTIONAL ELEMENT

CROSS-REFERENCE TO RELATED APPLICATIONS

This application is the U.S. National Stage of PCT/EP2020/051221, filed Jan. 20, 2020, which in turn claims priority to European patent application number 19 152 938.7 filed Jan. 22, 2019. The content of these applications are incorporated herein by reference in their entireties.

The invention relates to laminated pane arrangements that have, in each case, a laminated pane with an electro-optical functional element based on liquid crystals.

Electro-optical functional elements with electrically controllable optical properties have long been known in great variety and are used in industrial mass production, for example, in TV sets, laptops, mobile phones/smart phones, and tablets.

Laminated panes with electro-optical functional elements are also known per se. The optical properties of the functional elements can be changed by an applied electrical voltage. SPD functional elements (suspended particle device), known, for example, from EP 0876608 B1 and WO 2011033313 A1, are an example of such functional elements. The transmittance of visible light through SPD functional elements can be controlled by the voltage applied.

Functional elements based on liquid crystals, in particular PDLC functional elements (polymer dispersed liquid crystal), known, for example, from DE 102008026339 A1, are another example. The active layer contains liquid crystals embedded in a polymer matrix. When no voltage is applied to the flat electrodes, the liquid crystals are aligned in a disorderly manner, resulting in strong scattering of the light passing through the active layer such that the functional element becomes opaque. When voltage is applied to the flat electrodes, the liquid crystals align themselves in a common direction and the scattering of light by the functional element is reduced to a minimum such that it becomes transparent.

Windshields have been proposed in which an electrically controllable sun visor is implemented by means of an electro-optical functional element to replace the conventional mechanically pivotable sun visor in motor vehicles. Windshields with electrically controllable sun visors are known, for example, from DE 102013001334 A1, DE 102005049081 B3, DE 102005007427 A1, and DE 102007027296 A1.

SPD or PDLC functional elements are commercially available as multilayer films in which the active layer and the flat electrodes required for applying voltage are arranged between two carrier films, typically made of PET. In the production of the laminated pane, the functional element is cut from the multilayer film in the desired size and shape and inserted between the films of an intermediate layer by means of which two glass panes are laminated to one another to form the laminated pane.

As is known per se to the person skilled in the art, the switching characteristics, in particular the reaction speed, of electro-optical functional elements depends on the temperature of the active layer. Thus, in practice, depending on the respective ambient conditions, an undesirable change in the switching characteristics of the functional element can occur.

To remedy this problem, DE 102010048987 A discloses a pane having a functional element based on an electrochromic material that can be switched by a DC voltage, in which the two flat electrodes can be heated by a DC voltage (electrical resistance heating). An analogous functional element can be found in DE 4121385 A1. U.S. Pat. No. 5,124,833 also discloses a functional element having an electrochromic material that is switched by a DC voltage, wherein one flat electrode can be heated by applying an AC voltage.

In contrast, the object of the present invention is to provide an improved laminated pane arrangement with a laminated pane having a functional element based on liquid crystals whose switching characteristics are independent of the external environment as a result of heating at least one flat electrode.

The object is accomplished by laminated pane arrangements with the features of the independent claims. Advantageous embodiments emerge from the dependent claims.

According to the invention, two different laminated pane arrangements are disclosed, having, in each case, a laminated pane. Both laminated pane arrangements accomplish the object mentioned above and are based on the same inventive concept of realizing control of the optical properties of the active layer as well as electrical resistance heating of at least one flat electrode by applying two different AC voltages.

The laminated pane comprises an outer pane and an inner pane joined to one another via an intermediate layer. The laminated pane is intended, in a window opening, for example, of a motor vehicle or of a building, to separate the interior from the external environment. In the context of the invention, "inner pane" refers to the pane facing the interior. "Outer pane" refers to the pane facing the external environment. The thermoplastic intermediate layer serves to join the two panes, as is customary with laminated panes.

The outer pane and the inner pane are preferably made of glass. However, in principle, they can also be made of plastic. The thickness of the outer pane and the inner pane can vary widely and thus be adapted to the requirements of the individual case. The outer pane and the inner pane preferably have thicknesses from 0.4 mm to 3.5 mm, particularly preferably from 1 mm to 2.5 mm. The panes can be clear, tinted, or colored as long as the laminated pane has, in the central field of vision, sufficient light transmittance, preferably at least 70% in the main through-vision region A per ECE-R43, when the laminated pane is a windshield.

The outer pane, the inner pane, and/or the intermediate layer can have other suitable coatings known per se, for example, anti-reflective coatings, nonstick coatings, anti-scratch coatings, photocatalytic coatings, or solar protection coatings or low-E coatings.

The laminated pane contains an electro-optical functional element with electrically controllable optical properties that is embedded in the intermediate layer. Advantageously, the functional element is arranged between at least two layers of thermoplastic material of the intermediate layer, being connected to the outer pane by the first layer and to the inner pane by the second layer.

The functional element includes at least one active layer based on liquid crystals, preferably arranged between a first carrier film and a second carrier film. The active layer has the variable optical properties that can be controlled by an AC electrical voltage applied to the active layer. In the context of the invention, "electrically controllable optical properties" means properties that can be continuously controlled, but also properties that can be switched between two or more discrete states. The optical properties relate, in particular, to the light transmittance and/or to the scattering behavior of light.

The functional element also includes two flat electrodes (planar control electrodes) for applying an AC voltage to the active layer, which are preferably arranged between the carrier films and the active layer. Typically, one flat electrode for controlling the optical properties of the active layer is arranged on each side of the active layer. The flat electrodes are electrically conductively connected to the active layer. The flat electrodes can rest directly on the active layer, with electrically conductive intermediate layers also possibly provided between the flat electrodes and the active layer.

In the functional element, at least one of the flat electrodes, in particular both flat electrodes, serve to set the temperature of the active layer to a predetermined or predeterminable temperature. Thus, the flat electrodes serve not only, as is always the case with such laminated panes, for electrical control of the optical properties of the functional element, but, additionally, for setting a temperature of the active layer that is advantageous in terms of switching behavior.

The at least one flat electrode that is used to heat the active layer is implemented, in terms of material composition and/or layer thickness such that temperature control of the active layer to a predetermined or predeterminable temperature is achieved by sheet resistance when connected to a voltage source. The at least one planar flat electrode that is used for active heating of the active layer can be heated by ohmic heating (resistance heating) when subjected to appropriate voltage. By heating at least one flat electrode, in particular both flat electrodes, the active layer can be heated as desired.

The optical properties of the functional element based on liquid crystals can be controlled by application of an AC electrical voltage. A DC electrical voltage is not suitable for this. Preferably, the functional element based on liquid crystals is a PDLC functional element. The active layer of a PDLC functional element contains liquid crystals that are embedded in a polymer matrix. Such a PDLC functional element and its mode of operation are known per se to the person skilled in the art such that a detailed description can be dispensed with here.

The flat electrodes and the active layer are planar structures and are typically arranged substantially parallel to the surfaces of the outer pane and the inner pane.

The flat electrodes of the functional element are electrically connected, in a manner known per se, to two external voltage sources to provide AC voltages different from one another. For this purpose, the flat electrodes have in each case electrical connections wherein each flat electrode has at least one electrical connection.

The flat electrodes are preferably designed as transparent, electrically conductive layers. The flat electrodes preferably contain at least a metal, a metal alloy, or a transparent conductive oxide (TOO). The flat electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The flat electrodes preferably have a thickness of 10 nm to 2 µm, particularly preferably from 20 nm to 1 µm, most particularly preferably from 30 nm to 500 nm.

The functional element is, in particular, a multilayer film with two outer carrier films. In such a multilayer film, the flat electrodes and the active layer are typically arranged between the two carrier films. Here, the expression "outer carrier films" means that the carrier films form the two surfaces of the multilayer film. As a result, the functional element be provided as a prefabricated laminated film that can advantageously be further processed. The two carrier films advantageously protect the functional element against damage, in particular corrosion.

Each voltage source has two voltage outputs for providing an AC electrical voltage. The electrical connections of the flat electrodes are electrically conductively connected to the voltage outputs of the voltage sources via electrical supply lines.

In accordance with a first aspect of the invention, a laminated pane arrangement is presented that has a laminated pane with an electro-optical functional element, as described above.

The functional element has a first flat electrode and a second flat electrode. The first flat electrode is provided with a first connection and a second connection that are preferably arranged opposite one another in the plane of the first flat electrode. Correspondingly, the second flat electrode is provided with a first connection and a second connection that are preferably arranged opposite one another in the plane of the second flat electrode.

Advantageously, a distance between the first and second connection of the first flat electrode is equal to a distance between the first and second connection of the second flat electrode.

The laminated pane arrangement further includes a first circuit that has a first voltage source with a first and second voltage output for providing a first AC voltage.

The laminated pane arrangement further includes a second circuit that has a second voltage source with a first and second voltage output for providing a second AC voltage.

It is essential here for a maximum voltage (maximum amplitude) of the second AC voltage to be greater than a maximum voltage of the first AC voltage and for the two AC voltages to have the same frequency. "Maximum value of the AC voltage" means the largest voltage value (absolute value) of the AC voltage. Preferably, the two AC voltages are in phase, i.e., in the same phase. Thus, the power supplies are operated in phase.

The first voltage output of the first voltage source is electrically conductively connected exclusively to the first connection of the first flat electrode, and the second voltage output of the first voltage source is electrically conductively connected exclusively to the first connection of the second flat electrode. In addition, the first voltage output of the second voltage source is electrically conductively connected exclusively to the first connection of the second flat electrode, and the second voltage output of the second voltage source is electrically conductively connected exclusively to the second connection of the second flat electrode.

The circuitry of the two flat electrodes having two different AC voltages enables, on the one hand, electrical resistance heating of both flat electrodes by means of the AC voltages dropping in the respective plane of the flat electrodes. On the other hand, the optical properties of the functional element can be controlled by a local AC voltage that has the same frequency and, preferably, the same amplitude perpendicular to the functional element or to the active layer. The two voltage sources thus jointly serve both to switch or to control the optical properties of the functional element and to heat the flat electrodes. The connections of the flat electrodes are used for controlling the optical properties of the active layer and for resistance heating of the flat electrodes. Advantageously, it is not necessary to provide separate connections for controlling the optical properties of the functional element and for heating the flat electrodes.

In accordance with a second aspect of the invention, a laminated pane arrangement is presented that has a laminated pane with an electro-optical functional element, as described above.

The laminated pane arrangement includes a first circuit that has a first voltage source with a first and second voltage output for providing a first AC voltage.

The laminated pane arrangement further includes a second circuit that has a second voltage source with a first and second voltage output for providing a second AC voltage.

It is essential here for the frequency of the second voltage source to be greater than the frequency of the first voltage source. The maximum values of the two AC voltages can be the same or different from another.

The first voltage output of the first voltage source is electrically conductively connected exclusively to a first connection of the first flat electrode, and the second voltage output of the first voltage source is electrically conductively connected exclusively to a first connection of the second flat electrode. The first voltage source is used only for switching or controlling the optical properties of the functional element. The first voltage source is thus not used for heating a flat electrode.

At least one flat electrode, in particular both flat electrodes, are heated by a second voltage source. The second voltage source is used only for heating at least one flat electrode. The second voltage source is not used for switching or controlling the optical properties of the functional element.

The first voltage output of the second voltage source is electrically conductively connected, with the interposition of a high-pass filter, to the first connection connected to the first voltage source or to another first connection of the first flat electrode. In addition, the second voltage output of the second voltage source is electrically conductively connected, with the interposition of a high-pass filter, to a second connection of the first flat electrode. This allows the first flat electrode to be electrically heated.

The first flat electrode thus has one or two first connections and one second connection. If the first flat electrode has two first connections, one first connection is used for electrical connection only to the first voltage source and the other first connection is used for connection only to the second voltage source. Particularly advantageously, the first flat electrode has only a single first connection and a (single) second connection. In this case, the first connection is used both for connection to the first voltage source and for connection to the second voltage source such that the first connection is advantageously used for direct electrical connection to both voltage sources.

Additionally, or alternatively, the first voltage output of the second voltage source is electrically conductively connected, with the interposition of a high-pass filter, to the first connection connected to the first voltage source or to another first connection of the second flat electrode; and the second voltage output of the second voltage source is electrically conductively connected, with the interposition of a high-pass filter, to a second connection of the second flat electrode. This allows the second flat electrode to be electrically heated.

The second flat electrode thus has one or two first connections and a second connection. If the second flat electrode has two first connections, one first connection is used for electrical connection only to the first voltage source and the other first connection is used only for connection to the second voltage source. Particularly advantageously, the second flat electrode has only a single first connection and a (single) second connection. In this case, the first connection is used both for connection to the first voltage source and to the second voltage source such that the first connection is advantageously used for both voltage sources.

During heating of both flat electrodes, each flat electrode has at least two connections, the functional element thus has at least four connections, in particular exactly four connections. During heating of only a single flat electrode, the flat electrode has at least two connections, in particular exactly two connections, with it being sufficient for the other flat electrode to have only one single connection. Consequently, the functional element has at least three connections, in particular exactly three connections, to the flat electrodes.

The high-pass filters, which are typically capacitors, are designed such that they are permeable to the higher-frequency AC voltage of the second voltage source and block the lower-frequency AC voltage of the first voltage source. This avoids interference with the control of the optical properties of the functional element by the higher-frequency AC voltage of the second voltage source, which is used exclusively for the electrical resistance heating of the first and/or the second flat electrode.

The circuitry of the two flat electrodes with two different AC voltages enables, on the one hand, controlling the optical properties of the functional element by the first AC voltage with lower frequency; and, on the other hand, resistance heating of at least one flat electrode by the second AC voltage with higher frequency. The high-pass filters prevent interference with the control of the optical properties of the functional element by the second AC voltage with higher-frequency. The connections of the flat electrodes are advantageously used both for controlling the optical properties of the active layer and for resistance heating of the flat electrodes.

The following statements refer to the laminated pane arrangements in accordance with the first and second aspect of the invention.

It is advantageous for the at least one flat electrode, in particular both flat electrodes to be heated such that the active layer is heated to a temperature in the range above +5° C., preferably above 10° C. The temperature range to which the active layer should be set is preferably in the range from 5° C. to 25° C., particularly preferably in the range from 10° C. to 20° C. The temperature of the active layer can be set by regulating the voltage to the ohmic resistance heating of the at least one flat electrode. The temperature of the active layer can be measured by a temperature sensor.

In accordance with one embodiment of the invention, elongated connections, in particular bus bars, are provided, preferably at opposite edges of each flat electrode, for connection of the flat electrodes to the voltage sources. The flat electrodes preferably have, in each case, a rectangular shape. Depending on the embodiment, a flat electrode can have one or two bus bars.

Preferably, the electro-opticale functional element has an elongated shape, and elongated electrical connections are arranged at long edges of the functional element. However, in principle, in the case of a rectangular shape of the functional element, a connection via the short side edges is also possible, for example, to implement a sun visor or the like.

In accordance with one embodiment, the laminated pane has a temperature sensor in or near the electro-optical functional element within the intermediate layer. Regardless of the fact that, for instance, when the laminated pane is used in road vehicles, external and internal temperature sensors are usually present on/in the vehicle anyway, such an embodiment enables more precise detection of the temperature of the active layer and, thus, also more reliable setting of the desired temperature or temperature range of this layer. However, if the requirements for setting accuracy are lower, the signals of existing temperature sensors (outside the laminated pane) can also be used.

Preferably, the laminated pane is the windshield of a motor vehicle, in particular of a passenger car, with an electrically controllable sun visor implemented by the functional element. Whereas the side edges and the upper edge of such a functional element are typically concealed by the customary masking print in the edge region of the pane, the lower edge is arranged in the through-vision region of the pane and is thus not masked and is visible. This lower edge of the functional element is preferably sealed according to the invention. The visually inconspicuous seal is particularly advantageous here.

An electrically controllable sun visor can make the conventional mechanically pivotable sun visor superfluous. As a result, space is gained in the passenger compartment of the vehicle, the weight of the vehicle is reduced, and the risk of collision with the sun visor in the event of severe braking or an accident is avoided. In addition, electrical control of the sun visor may be perceived as more convenient than pivoting it down mechanically.

Equally preferably, the laminated pane is a roof glazing (roof panel), side window, or rear window of a motor vehicle.

The windshield has an upper edge and a lower edge as well as two side edges extending between the upper edge and the lower edge. The term "upper edge" refers to that edge which is intended, in the installed position, to point upward. The term "lower edge" refers to that edge which is intended, in the installed position, to point downward. The upper edge is also referred to as the "roof edge"; the lower edge, as the "engine edge". The edges of the functional element are referred to according to the installed position of the windshield. The lower edge of the functional element is thus the one of its side edges that faces away from the upper edge of the windshield and toward the central field of vision. The upper edge of the functional element faces the upper edge of the windshield. The side edges extend between the upper edge and the lower edge.

Windshields have a central field of vision whose optical quality is subject to high requirements. The central field of vision must have high light transmittance (typically greater than 70%). Said central field of vision is, in particular, that field of vision that is referred to by the person skilled in the art as the field of vision A and B. The field of vision A and B and its technical requirements are specified in Regulation No. 43 of the Economic Commission for Europe of the United Nations (UN/ECE) (ECE-R43, "Uniform Provisions Concerning the Approval of Safety Glazing Materials and Their Installation on Vehicles"). The field of vision A and B is defined there in Annex 18.

The functional element is arranged above the central field of vision (field of vision B). This means that the functional element is arranged in the region between the central field of vision and the upper edge of the windshield. The functional element need not cover the entire region but is positioned completely within this region and does not protrude into the central field of vision. In other words, the functional element is a shorter distance from the upper edge of the windshield than the central field of vision. Thus, the transmittance of the central field of vision is not adversely affected by the functional element, which is situated at a position similar to that of a conventional mechanical sun visor in the downward pivoted state.

The electrical control of the sun visor is done, for example, by knobs, rotary controls, or sliders, that are integrated into the dashboard of the vehicle. However, a switch area, for example, a capacitive switch area, for control of the sun visor can also be integrated into the windshield. Alternatively, the sun visor can also be controlled by contactless methods, for example, by gesture recognition, or as a function of the pupil or eyelid state and the position of the sun determined by a camera and suitable evaluation electronics. An electro-optical functional element that functions not as a sun visor but, instead, for example, as part of a head-up display, can, in principle, also be controlled similarly in terms of its electro-optical properties and temperature controlled in accordance with the invention.

In a preferred embodiment, the lower edges of the functional element and of the tinted region of the thermoplastic layer are adapted to the shape of the upper edge of the windshield, resulting in a visually more attractive appearance. Since the upper edge of a windshield is typically curved, in particular concavely curved, the lower edge of the functional element and of the tinted region is also preferably curved.

Particularly preferably, the lower edges of the functional element are designed substantially parallel to the upper edge of the windshield. However, it is also possible to construct the sun visor from two halves, straight in each case, that are arranged at an angle relative to one another and that form a V, approximating the shape of the upper edge.

In an advantageous further development of the invention, the electro-optical functional element can be divided into segments by isolating lines. The isolating lines can, in particular be introduced into the flat electrodes such that the segments of the flat electrode are electrically isolated from one another. The individual segments are connected to the voltage source independently of one another such that they can be controlled separately. Thus, different regions of the sun visor can be switched independently. Particularly preferably, the isolating lines and the segments are arranged horizontally in the installed position. Thus, the height of the sun visor can be controlled by the user. Here, the term "horizontally" is to be interpreted broadly and means a propagation direction, running between the side edges of the windshield. The isolating lines need not necessarily be straight but can, instead, also be slightly curved, preferably adapted to any curvature of the upper edge of the windshield, in particular substantially parallel to the upper edge of the windshield. Vertical isolating lines are, of course, also conceivable. The isolating lines have, for example, a width of 5 µm to 500 µm, in particular 20 µm to 200 µm. The width of the segments, i.e., the distance between adjacent isolating lines, can be suitably selected by the person skilled in the art in accordance with the requirements of the individual case. Already laminated multilayer films can still be segmented later using laser ablation.

In the case of a segmented sun visor, as described above, segmented temperature control of the active layer can only be achieved for the parts of the electro-optical functional element that are actually controlled. However, in principle, it is also possible to provide, in addition to a segmented flat electrode, a nonsegmented additional flat electrode (above or below the segmented flat electrode) as a special heating electrode. With such a heating electrode, the entire area of the active layer of the functional element can be temperature controlled independently of which regions (segments) thereof are actually electrically controlled.

When looking through the windshield, the upper edge and the side edges of the functional element are preferably covered by an opaque masking print. Windshields typically have a surrounding peripheral masking print made of an opaque enamel, serving in particular to protect and visually to conceal the adhesive used for installation of the windshield against UV-radiation. This peripheral masking print is preferably used to also cover the upper edge and the side edge of the functional element, as well as the necessary electrical connections. The sun visor is then advantageously integrated into the appearance of the windshield and only the lower edge is potentially visible to the viewer. Preferably, both the outer pane and the inner pane have a masking print such that through-vision is prevented from both sides.

In another preferred embodiment, the laminated pane according to the invention is a roof panel of a motor vehicle, the transparency of which can be controlled by the functional element. The functional element is preferably arranged in a large part of the roof panel, in particular over its entire surface with the exception of a peripheral edge region with a width of, for example, 5 cm to 20 cm. In this embodiment as well, the functional element can, for example, be structured to be able to set the transparency in the front and rear region and/or in the left and right region separately from one another.

The invention also extends to a motor vehicle with a laminated pane arrangement according to the invention.

The two circuits of the laminated pane arrangement can be electrically conductively connected to a control device for controlling the optical properties of the functional element and the heating of at least one flat electrode. In particular, the two circuits of the laminated pane arrangement can be connected to an onboard electrical system for controlling the optical properties of the functional element and the heating of at least one flat electrode by an onboard control device.

The above-described embodiments of the invention can be combined with one another in any manner desired.

Figure 2:
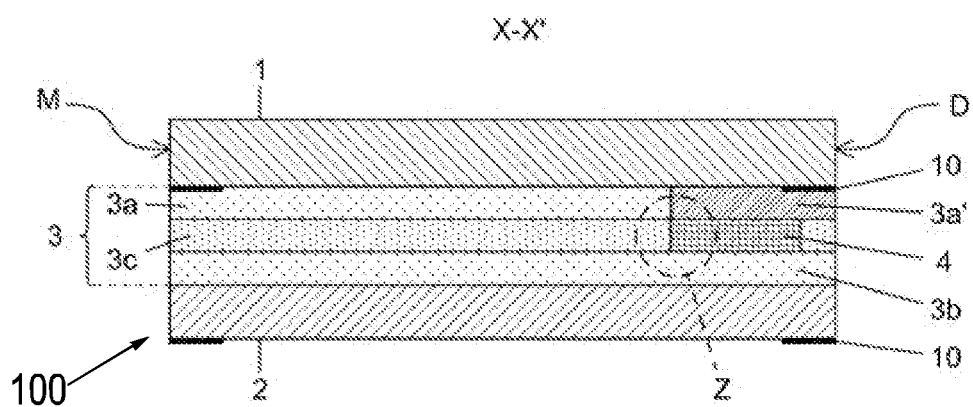
Figure 3:
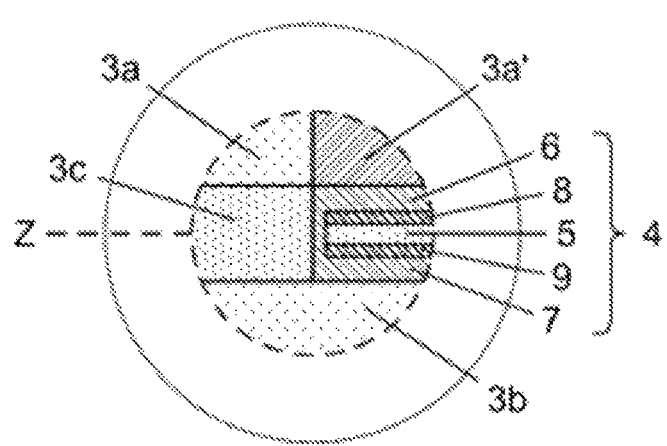
Figure 4:
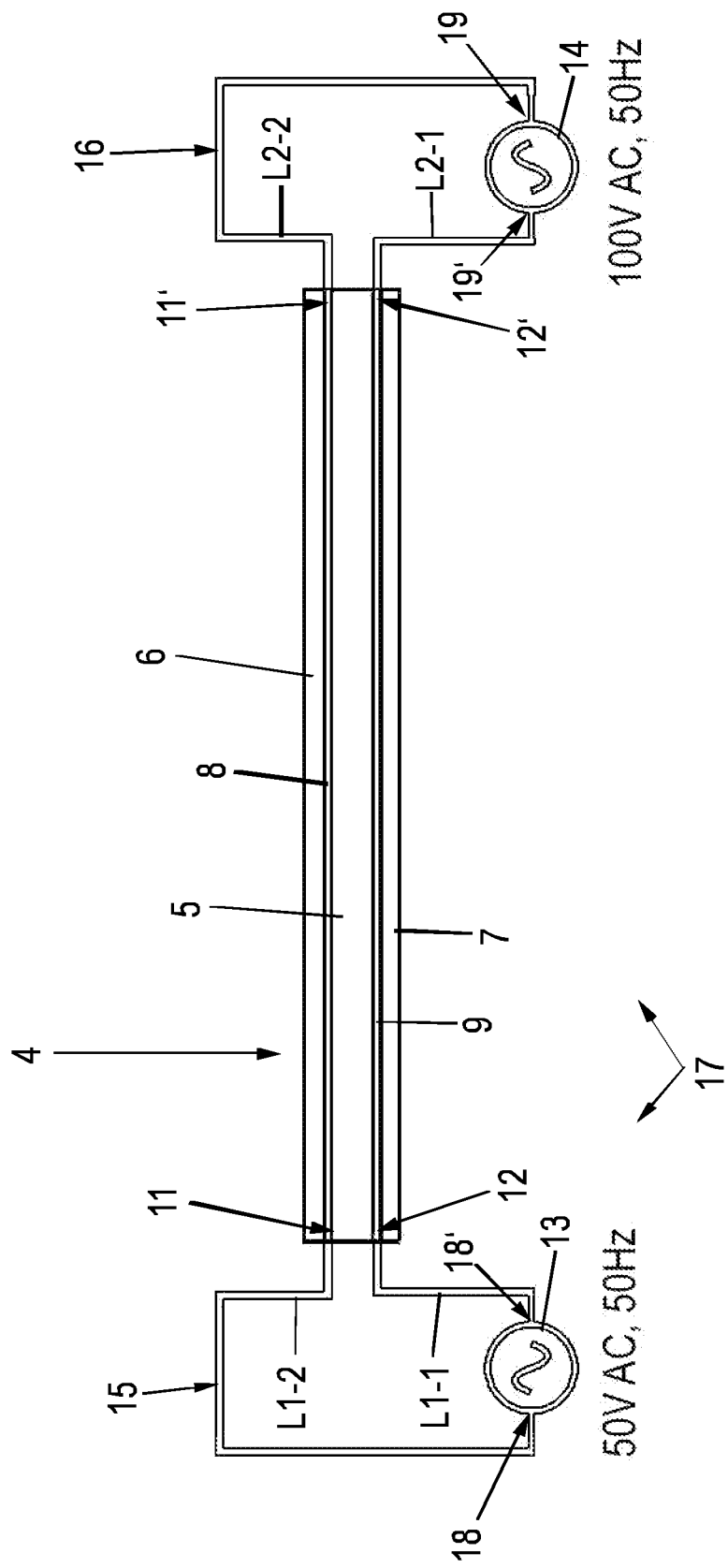
Figure 5:
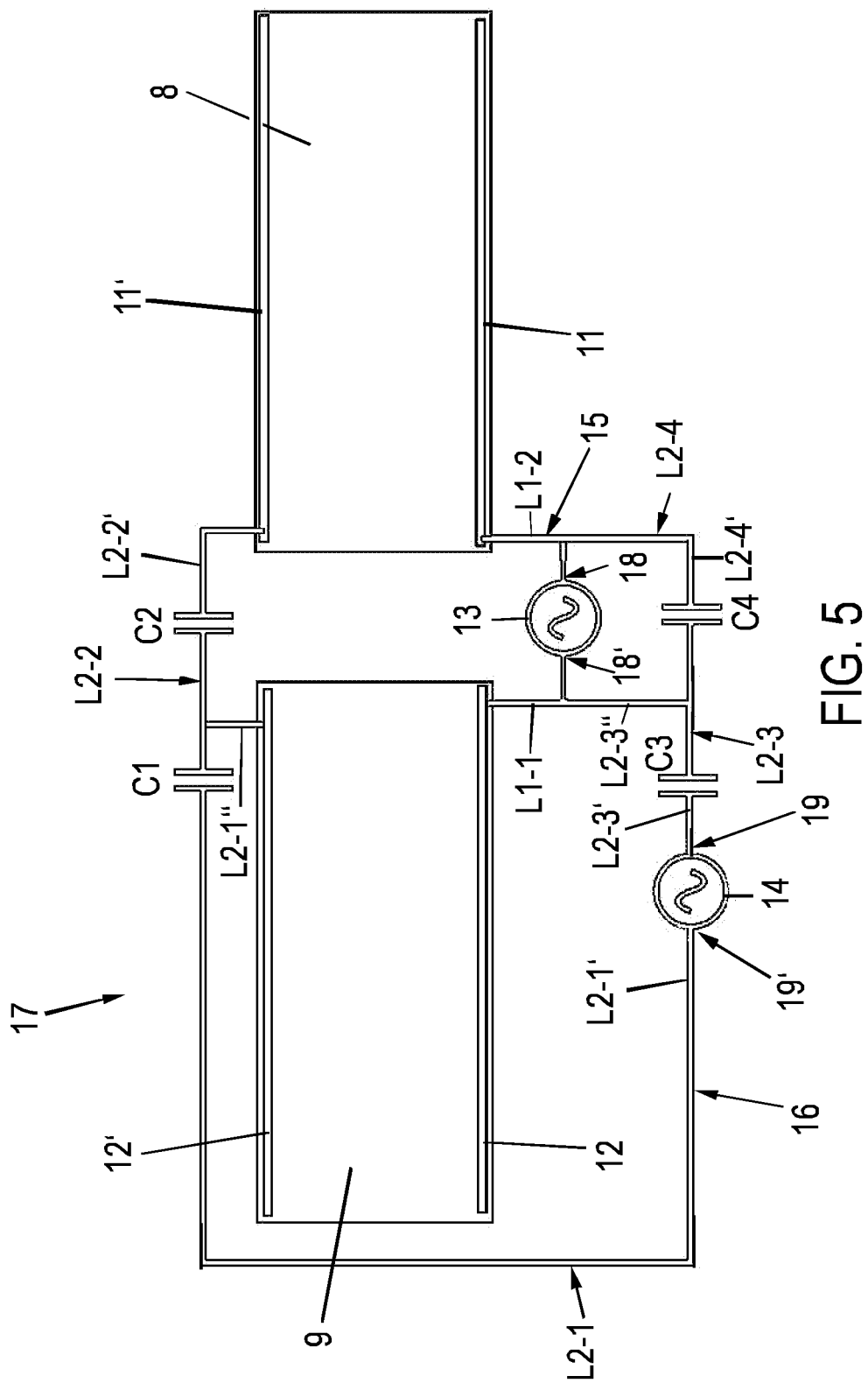
Figure 6:
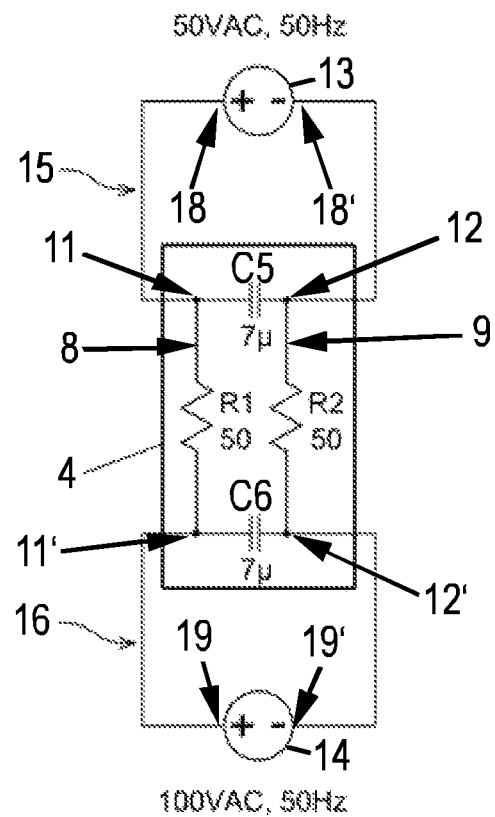
Figure 7:
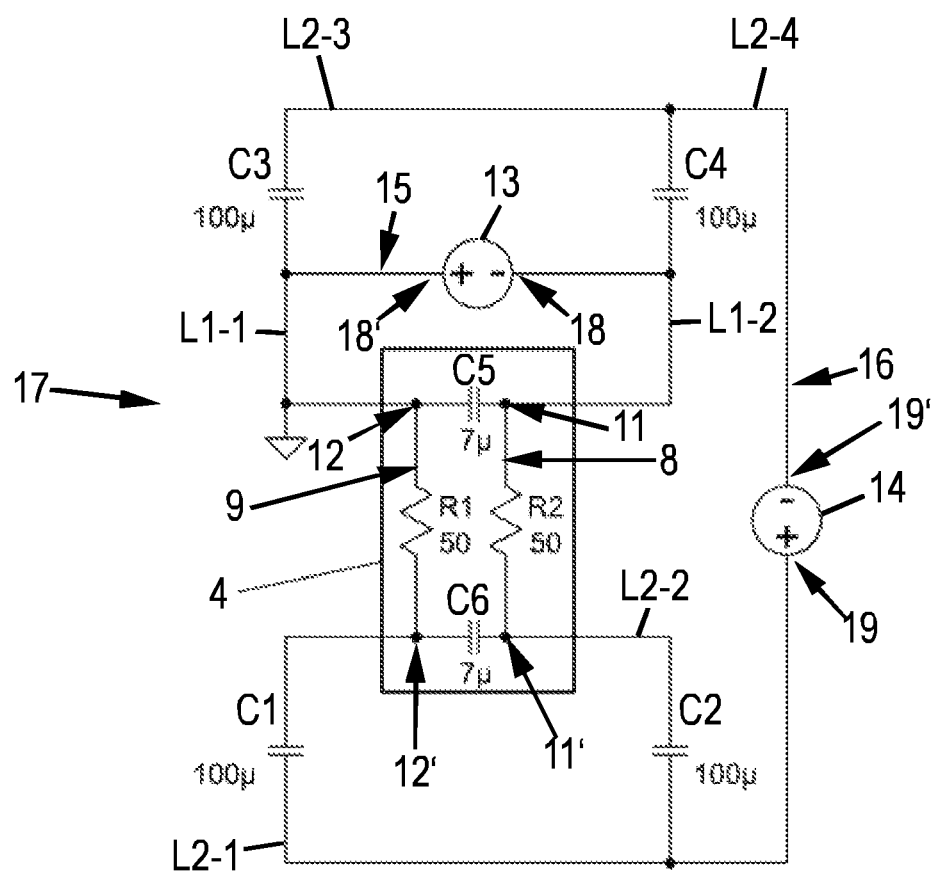

The invention is now explained in greater detail with reference to figures and exemplary embodiments. The figures are schematic representations, not to scale, and in no way restrict the invention. They depict:

FIG. 1 a plan view of an embodiment of the laminated pane as a windshield with an electrically controllable sun visor, FIG. 2 a cross-section through the windshield of FIG. 1 according to section line x-x', FIG. 3 an enlarged representation of the region Z of FIG. 2, FIG. 4 a schematic representation of the circuitry of the functional element in accordance with an embodiment of the laminated pane arrangement of FIG. 1, FIG. 5 a schematic representation of the circuitry of the functional element in accordance with another embodiment of the laminated pane arrangement of FIG. 1, FIG. 6 an equivalent circuit diagram of the embodiment of the laminated pane arrangement of FIG. 4, FIG. 7 an equivalent circuit diagram of the alternative embodiment of the laminated pane arrangement of FIG. 5.

Reference is made first to FIG. 1 through 3, wherein the laminated pane of the laminated pane arrangement according to the invention is illustrated, here, for example, as a windshield of a motor vehicle. The laminated pane is referenced as a whole with the reference number 100; the laminated pane arrangement, with the reference number 101.

In FIG. 1 through 3, the other components of the laminated pane arrangement 101 in addition to the laminated pane 100 are not shown in greater detail. They are apparent from the other figures.

Accordingly, the laminated pane 100 comprises an outer pane 1 and an inner pane 2 joined to one another via a thermoplastic intermediate layer 3. The outer pane 1 has, for example, a thickness of 2.1 mm and is made of a green-colored soda lime glass. The inner pane 2 has, for example, a thickness of 1.6 mm and is made of a clear soda lime glass. The laminated pane 100 has, in the installed position, an upper edge D facing the roof and a lower edge M facing the engine compartment.

The laminated pane 100 is equipped with an electrically controllable sun visor S (see FIG. 1), which is situated in a region above a central field of vision B (as defined in ECE-R43). The sun visor S is formed by an electro-optical functional element 4, which is, in this case, for example, a commercially available PDLC multilayer film. The functional element 4 is embedded in the intermediate layer 3. The height of the sun visor S is, for example, 21 cm.

The intermediate layer 3 includes a total of three thermoplastic layers 3a, 3b, 3c, formed in each case by a thermoplastic film made of polyvinyl butyral (PVB) with a thickness of 0.38 mm. A first thermoplastic layer 3a is bonded to the outer panel; a second thermoplastic layer 3b is bonded to the inner pane 2. A third thermoplastic layer 3c interposed therebetween has a cutout, into which the cut-to-size functional element 4 is inserted with a substantially precise fit, i.e., approx. flush on all sides. The third thermoplastic layer 3c thus forms, so to speak, a sort of passe-partout (frame) for the roughly 0.4-mm-thick functional element 4, which is thus encapsulated all around in thermoplastic material and thus protected.

The first thermoplastic layer 3a has a tinted region 3a' arranged between the functional element 4 and the outer pane 1. The light transmittance of the laminated pane 100 is, as a result, additionally reduced in the region of the sun visor S (i.e., the functional element 4); and the milky appearance of the functional element 4 in the diffuse state is toned down. The aesthetics of the laminated pane 100 are thus made significantly more appealing. The first thermoplastic layer 3a has, in the tinted region 3a', for example, an average light transmittance of 30%, with which good results are achieved. The tinted region 3a' can be homogeneously tinted. However, it is often more appealing visually if the tinting decreases in the direction of the lower edge of the functional element 4 such that the tinted region 3a' and the non-tinted region transition smoothly. In the case depicted, the lower edges of the tinted region 3a' and the functional element 4 are arranged flush. This is, however, not necessarily the case. It is also possible for the tinted region 3a' to protrude beyond the functional element 4 or, conversely, for the the functional element 4 to protrude beyond the tinted region 3a'

The electrically controllable functional element 4 is a PDLC multilayer film, consisting of an active layer 5 between two flat electrodes 8, 9 and two carrier films 6, 7 (see FIG. 3). The active layer 5 contains a polymer matrix with liquid crystals dispersed therein, which align themselves as a function of the electrical voltage applied to the flat electrodes 8, 9, by which means the optical properties can be controlled. The carrier films 6, 7 are made of PET and have a thickness of, for example, approx. 0.2 mm. The carrier films 6, 7 are provided with a coating of ITO with a thickness of approx. 100 nm facing the active layer 5, forming the flat electrodes 8, 9. The flat electrodes 8, 9 can be connected to an onboard electrical system by means of bus bars (not shown in FIG. 1 through 3), produced, for example, by a silver-containing screen print, and to an onboard electrical system by connection cables (not shown). By subjecting the two flat electrodes 8, 9 to a switching voltage (AC voltage), the light scattering of the functional element 4 can be changed, i.e., the opacity (and thus the glare effect) of the sun visor S for light sources can be changed in a targeted manner.

The laminated pane 100 has, as is customary, a surrounding peripheral masking print 10 formed by an opaque enamel on the interior-side surface (facing the interior of the vehicle in the installed position) of the outer pane 1 and the inner pane 2. The distance of the functional element 4 from the upper edge D and the side edges of the laminated pane 100 is less than the width of the masking print 10 such that the side edges of the functional element 4—with the exception of the side edge facing the central field of vision B—are concealed by the masking print 10. The electrical connections (not shown) are also expediently installed in the region of the masking print and are thus hidden.

Reference is now made to FIGS. 4 and 5, wherein two alternative circuit configurations of the functional element 4 are illustrated schematically. FIGS. 4 and 5 illustrate schematically, in each case, only the functional element 4 of the laminated pane 100 of the laminated pane arrangement 101 of FIG. 1. FIG. 5 depicts the functional element 4 in an "unfolded" state, in which the viewer looks at one respective surface (e.g., inner surface) of the flat electrodes 8, 9. The active layer 5 is not shown.

The two flat electrodes 8, 9 have in each case a rectangular shape. The first flat electrode 8 has two bus bars 11, 11' positioned opposite one another in the plane of the first flat electrode 8, which are, for example, arranged here at the opposite long sides of the first flat electrode 8. In a corresponding manner, the second flat electrode 9 has two bus bars 12, 12' positioned opposite one another in the plane of the second flat electrode 9, which are, for example, arranged here at the opposite long sides of the second flat electrode 9. The bus bars 11, 11', 12, 12' can be arranged on the outer surface and/or inner surface of the respective associated flat electrode 8, 9. The bus bars 11, 11', 12, 12' are used to subject the functional element 4 to a voltage as will be explained in more detail below. In the embodiments of FIGS. 4 and 5, the functional element 4 is designed the same in each case; only its circuitry is different.

In the laminated pane arrangement 101 according to the invention, the flat electrodes 8, 9 serve not only for controlling the optical properties of the functional element 4, but at least one of the flat electrodes 8, 9 also serves to heat the active layer 5 to a predetermined or predeterminable temperature, by heating the at least one flat electrode 8, 9 by electrical resistance heating. For this purpose, the laminated pane arrangement 101 has a first voltage source 13 and a second voltage source 14, wherein the second voltage source 14 is different from the first voltage source 13. The first voltage source 13 and the second voltage source 14 provide, in each case, an AC electrical voltage.

The functional element 4 is designed such that its optical properties (e.g., transmittance of light through the active layer 5) are controlled by an AC electrical voltage, but not by a DC electrical voltage. This is a PDLC functional element 4 with an active layer 5 based on liquid crystals. The functional element 4 represents, so to speak, a voltage-controlled light valve whose optical properties can be changed as a function of the AC voltage applied.

FIG. 4 is considered first. This depicts the functional element 4 of the laminated pane 100 of FIG. 1, consisting of the active layer 5, the two flat electrodes 8, 9, and the two carrier films 6, 7. The functional element 4 is depicted in cross-section perpendicular to the flat electrodes 8,9. The bus bars 11, 11', 12, 12' of the flat electrode 8, 9 are not shown in detail.

The wiring of the functional element 4 is done by two circuits 15, 16, which are part of a circuit 17. The two circuits 15, 16 are or can be connected to the onboard electrical system, in particular for connection to an onboard control unit (controller) for controlling the sun visor S.

A first circuit 15 includes a first voltage source 13 as well as the two electrical lines L1-1 and L1-2. The electrical line L1-1 electrically conductively connects one voltage connection 18' of the first voltage source 13 to the bus bar 12 of the lower flat electrode 9; the other line L1-2 electrically conductively connects the other voltage connection 18 of the first voltage source 13 to the bus bar 11 of the upper flat electrode 8. The two bus bars 11, 12 are positioned opposite one another perpendicular to the plane of the active layer 5.

A second circuit 16 includes the second voltage source 14 as well as the two electrical lines L2-1 and L2-2. The electrical line L2-1 electrically conductively connects one voltage connection 19' of the second voltage source 14 to the bus bar 12' of the lower flat electrode 9; the other line L2-2 electrically conductively connects the other voltage connection 19 of the second voltage source 14 to the bus bar 11' of the upper flat electrode 8. The two bus bars 11', 12' are positioned opposite one another perpendicular to the plane of the active layer 5.

Thus, the first voltage source 13 is electrically conductively connected to the two bus bars 11, 12 on one long side of the functional element 4; and the second voltage source 14 is electrically conductively connected to the two bus bars 11', 12' on the other long side of the functional element 4.

The two voltage sources 13, 14 provide an AC electrical voltage. The first voltage source 13 has a lower maximum voltage value than the second voltage source 14. The frequencies of the AC voltages of the two voltage sources 13, 14 are the same. In addition, the AC voltages are in phase. For example, the first voltage source 13 provides an AC voltage (AC) having a maximum voltage value of 50 V and a frequency of 50 Hz; the second voltage source 14, an AC voltage (AC) having a maximum voltage value of 100 V and a frequency of 50 Hz.

Subjecting the upper flat electrode 8 to an AC voltage of 50 V on one side and an AC voltage of 100V on the other side causes a voltage drop in the plane of the first flat electrode 8 from one bus bar 11' to the other bus bar 11. This causes electrical resistance heating of the upper flat electrode 8. Correspondingly, subjecting the lower flat electrode 9 to an AC voltage of 50 V on one side and to an AC voltage of 100 V on the other side causes a voltage drop in the plane of the second flat electrode 9 from one bus bar 12' to the other bus bar 12. This causes electrical resistance heating of the lower flat electrode 9. Thus, both flat electrodes 8, 9 are heated electrically, as a result of which the active layer 5 of the functional element 4 is heated.

In addition, the optical properties of the active layer 5 can be set as desired by applying two different AC voltages. No voltage drop occurs perpendicular to the plane of the active layer 5, i.e., in a perpendicular view through the active layer 5, the two flat electrodes 8, 9 locally have the same voltage in each case, which increases in the plane of the active layer 5 in the direction from one bus bar 11 to the other bus bar 11' (or in the direction from one bus bar 12 to the other bus bar 12'). The optical properties of the active layer 5 can thus be controlled by a locally constant voltage, i.e., without a voltage drop across the active layer 5. In the circuit 17 of FIG. 4, the first voltage source 13 and the second voltage source 14 thus serve together both to control the optical properties of the functional element 4 and to heat the active layer 5.

In practice, the two maximum values of the AC voltages of the two voltage sources 13, 14 should preferably be selected such that the conditions described in the following are jointly met. For example, the difference between the (maximum) voltage values must be selected such that no electrical short circuit (breakdown) occurs, in particular through the active layer 5. In addition, the higher the voltage applied to the active layer 5, the lower the haze caused by scattered light, provided no threshold voltage relevant to this effect is reached, starting from which the haze increases again. Thus, the voltage values would have to be selected such that the haze is reduced as much as possible. In addition, the voltage values should be selected such that a sufficiently high voltage drop occurs in the plane of the flat electrodes 8, 9 for the resistance heating. For commercially available PDLC functional elements 4, nominal voltages at which they should be operated are specified. To satisfy the above conditions, the maximum voltages of the two AC voltages for one and the same PDLC functional element 4 are preferably in the range from 80% to 150% of the specified nominal voltage of the PDLC functional element 4.

Reference is now made to FIG. 5, wherein, using a schematic representation, alternative circuitry of the otherwise identical functional element 4 of the laminated pane 100 of FIG. 1 is illustrated. As already stated, the functional element 4 is shown in an "unfolded" state, in which the two flat electrodes 8, 9 are arranged next to one another. The active layer 5 is not shown. For example, the respective inner surface of the flat electrodes 8, 9 faces the viewer.

As in the embodiment of FIG. 4, the wiring of the functional element 4 is provided by two circuits 15, 16, which, here, are part of a common circuit 17. The two circuits 15, 16 are or can be connected to the onboard electrical system, in particular for connection to a control device (controller) for controlling the sun visor S.

A first circuit 15 includes a first voltage source 13 and the two electrical lines L1-1 and L1-2. The electrical line L1-1 is electrically conductively connected to the bus bar 12 of the lower flat electrode 9; the other line L1-2 is electrically conductively connected to the bus bar 11 of the upper flat electrode 8. The two bus bars 11, 12 are positioned opposite one another perpendicular to the plane of the active layer 5. Thus, the first voltage source 13 is electrically conductively connected to the two bus bars 11, 12 on one long side of the functional element 4.

A second circuit 16 includes a second voltage source 14 and four electrical lines L2-1, L2-2, L2-3 and L2-4, composed in each case of a plurality of line sections.

The electrical line L2-1 electrically conductively connects one voltage connection 19' of the second voltage source 14 to the bus bar 12' of the lower flat electrode 9. Starting from the second voltage source 14, the electrical line L2-1 is composed, in series, of the line section L2-1' and the line section L2-1". A capacitor C1 is situated in the line section L2-1'.

The electrical line L2-2 electrically conductively connects the same voltage connection 19' of the second voltage source 14 to the bus bar 11' of the upper flat electrode 8. Starting from the second voltage source 14, the electrical line L2-2 is composed, in series, of the line section L2-1' and the line section L2-2'. The capacitor C1 is situated in the line section L2-1'. Another capacitor C2 is situated in the line section 2-2', connected in series to the capacitor C1.

The electrical line L2-3 electrically conductively connects the other voltage connection 19 of the second voltage source 14 to the bus bar 12 of the lower flat electrode 9. Starting from the second voltage source 14, the electrical line L2-3 is composed, in series, of the line section L2-3', the line section L2-3", and the line L1-1. A capacitor C3 is situated in the line section L2-3'.

The electrical line L2-4 electrically conductively connects the same voltage connection 19 of the second voltage source 14 to the bus bar 11 of the upper flat electrode 8. Starting from the second voltage source 14, the electrical line L2-4 is composed, in series, of the line section L2-3', the line section L2-4', and the line L1-2. Another capacitor C4 is situated in the line section L2-4', connected in series to the capacitor C3.

Thus, the two voltage connections of the second voltage source 14 are electrically conductively connected in each case to the two bus bars 11, 11' of the upper flat electrode 8 and to the two bus bars 12, 12' of the lower flat electrode 9.

In the circuit 17 of FIG. 5, the first voltage source 13 serves only to control the light transmittance of the functional element 4. The second voltage source 14 serves only to heat the active layer 5. The two voltage sources 13, 14 provide, in each case, an AC electrical voltage, wherein the frequency of the AC voltage of the first voltage source 13 is lower than the frequency of the AC voltage of the second voltage source 14. In addition, the maximum value of the AC voltage of the first voltage source 13 is lower than that of the second voltage source 14. Due to the circuitry, the AC voltage of the first voltage source 13 drops only across the active layer 5 (perpendicular to the plane of the active layer 5), as a result of which the optical transparency of the active layer 5 can be controlled. For example, the voltage value corresponds to the nominal voltage of a commercially available PDLC functional element 4. The AC voltage of the second voltage source 14 drops in each case only in the planes of the flat electrodes 8, 9 such that they can be heated by electrical resistance heating.

The capacitance values of the capacitors C1-C4 are designed such that they act in each case as a high-pass filter for the higher-frequency of the AC voltage of the second voltage source 14, but block the lower-frequency AC voltage of the first voltage source 13. Thus, it is advantageously possible to prevent the control of the optical properties of the active layer 5 from being adversely affected by the AC voltage of the second voltage source 14 for heating the flat electrodes 8, 9. This enables selective control of the resistance heating of the flat electrodes 8, 9 as well as the optical transparency of the active layer 5.

FIGS. 6 and 7 depict in each case an equivalent circuit diagram of the laminated pane arrangement of FIGS. 4 and 5.

First consider FIG. 6, which refers to the embodiment of FIG. 4. For the functional element 4, the two flat electrodes 8, 9 are in each case represented as electrical resistors R1, R2 (here, for example, 50 ohm in each case). The arrangement of the two flat electrodes 8, 9 with an interposed active layer 5 is realized by the two capacitors C5, C6 (here, for example, 7 μF in each case). Situated in the first circuit 15 is the first voltage source 13, which electrically contacts the two flat electrodes 8, 9 on one side of the functional element 4 with both voltage connections 18, 18'. Situated in the second circuit 16 is the second voltage source 14, which electrically contacts the two flat electrodes 8, 9 on the other side of the functional element 4 with two voltage connections 19, 19'.

FIG. 7 depicts the equivalent circuit diagram of the embodiment of FIG. 5. The functional element 4 is designed as shown in FIG. 6. Situated in the first circuit 15 is the first voltage source 13, which electrically contacts the two flat electrodes 8, 9 on one side of the functional element 4 with two voltage connections 18, 18'. Situated in the second circuit 16 is the second voltage source 14, which electrically contacts the two flat electrodes 8, 9 with two voltage connections 19, 19' in each case. In this embodiment, two flat electrodes 8, 9 are heated. It would be conceivable to heat only one of the two flat electrodes 8, 9; for which purpose, the lines L2-2 and L2-4 can be omitted (heating of only the flat electrode 9) or, alternatively, the lines L2-1 and L2-3 can be omitted (heating of only the flat electrode 8).

The two embodiments of the pane arrangement 101 of FIGS. 4 and 5 enable targeted heating of the active layer 5 of the functional element 4 by resistance heating of at least one flat electrode 8, 9 such that its optical properties can be controlled well.

Preferably, a temperature sensor of a type known per se is provided within the laminated pane 100 and adjacent the electro-optical functional element 4. Its signal reports the actual temperature of the active layer 5 of the functional element 4, which preferably serves as an input variable for controlling the heating of the at least one flat electrode 8, 9.

As can be seen from the statements above, the invention creates a pane arrangement that is simple to realize in which the active layer of a functional element can be controlled and heated by two AC voltages.

LIST OF REFERENCE CHARACTERS

1 outer pane
2 inner pane
3 thermoplastic intermediate layer
3*a* first thermoplastic layer
3*a*' tinted region
3*b* second thermoplastic layer
3*c* third thermoplastic layer 3
4 functional element
5 active layer
6 first carrier film
7 second carrier film
8 first flat electrode
9 second flat electrode
10 masking print
11 first bus bar of the first flat electrode
11' second bus bar of the first flat electrode
12 first bus bar of the second flat electrode
12' second bus bar of the second flat electrode
13 first voltage source
14 second voltage source
15 first circuit
16 second circuit
17 circuit
18 first voltage output of the first voltage source
18' second voltage output of the first voltage source
19 first voltage output of the second voltage source
19' second voltage output of the second voltage source
100 laminated pane
101 laminated pane arrangement
B field of vision
D upper edge of the pane
M lower edge of the pane
S sun visor
X-X' section line

The invention claimed is:

1. A laminated pane arrangement, comprising:
    a laminated pane with an outer pane and an inner pane that are joined to one another via a thermoplastic intermediate layer, wherein a functional element is embedded in the thermoplastic intermediate layer, which functional element includes an active layer based on liquid crystals, whose optical properties are controllable by a first flat electrode and a second flat electrode, wherein the first flat electrode has a first and a second connection, and wherein the second flat electrode has a first and a second connection,
    a first circuit, which has a first voltage source with a first and second voltage output for providing a first AC voltage,
    a second circuit, which has a second voltage source with a first and second voltage output for providing a second AC voltage, wherein a maximum voltage of the second AC voltage is greater than a maximum voltage of the first AC voltage and the first and second AC voltages have the same frequency,
    wherein the first voltage output of the first voltage source is electrically conductively connected only to the first connection of the first flat electrode and the second voltage output of the first voltage source is electrically conductively connected only to the first connection of the second flat electrode, and
    wherein the first voltage output of the second voltage source is electrically conductively connected only to the first connection of the second flat electrode and the second voltage output of the second voltage source is electrically conductively connected only to the second connection of the second flat electrode.

2. The laminated pane arrangement according to claim 1, wherein the first and second connection of the first flat electrode are arranged opposite one another in a plane of the first flat electrode, or the first and second connection of the second flat electrode are arranged opposite one another in a plane of the second flat electrode.

3. The laminated pane arrangement according to claim 2, wherein a distance between the first and second connection of the first flat electrode is equal to a distance between the first and second connection of the second flat electrode.

4. The laminated pane arrangement according to claim 1, wherein the connections of the flat electrodes are in each case implemented in the form of elongated connections at opposite edges of the functional element.

5. The laminated pane arrangement according to claim 4, wherein the elongated connections are arranged at the long edges of the functional element.

6. The laminated pane arrangement according to claim 4, wherein the connections of the flat electrodes are in each case implemented in the form of bus bars.

7. The laminated pane arrangement according to claim 1, wherein the flat electrodes are in each case rectangular.

8. The laminated pane arrangement according to claim 1, wherein the flat electrodes are heatable such that the active layer of the functional element has a temperature in the range above +5° C.

9. The laminated pane arrangement according to claim 1, comprising a temperature sensor in or near the electro-optical functional element within the intermediate layer.

10. The laminated pane arrangement according to claim 1, wherein the laminated pane is implemented as a windshield, roof glazing, side window, or rear window of a motor vehicle.

11. The laminated pane arrangement according to claim 1, wherein the functional element is a PDLC functional element.

12. A motor vehicle with a laminated pane arrangement according to claim 1.

13. The laminated pane arrangement according to claim 1, wherein the first and second AC voltages are in phase.

14. A laminated pane arrangement, comprising:
- a laminated pane with an outer pane and an inner pane that are joined to one another via a thermoplastic intermediate layer, wherein a functional element is embedded in the intermediate layer, which functional element includes an active layer based on liquid crystals, whose optical properties are controllable by a first flat electrode and a second flat electrode,
- a first circuit, which has a first voltage source with a first and second voltage output for providing a first AC voltage,
- a second circuit, which has a second voltage source with a first and second voltage output for providing a second AC voltage, wherein a frequency of the second voltage source is greater than a frequency of the first voltage source,
- wherein the first voltage output of the first voltage source is electrically conductively connected only to a first connection of the first flat electrode and the second voltage output of the first voltage source is electrically conductively connected only to a first connection of the second flat electrode,
- wherein the first voltage output of the second voltage source is electrically conductively connected, with the interposition of a high-pass filter, to the first connection connected to the first voltage source or to a further first connection of the first flat electrode, and the second voltage output of the second voltage source is electrically conductively connected, with the interposition of a high-pass filter, to a second connection of the first flat electrode, or
- wherein the first voltage output of the second voltage source is electrically conductively connected, with the interposition of a high-pass filter, to the first connection connected to the first voltage source or to a further first connection of the second flat electrode, and the second voltage output of the second voltage source is electrically conductively connected, with the interposition of a high-pass filter, to a second connection of the second flat electrode,
- and wherein the high-pass filters are in each case designed such that the high-pass filters are permeable to the higher-frequency AC voltage of the second voltage source and block a lower-frequency AC voltage of the first voltage source.

15. The laminated pane arrangement according to claim 14, wherein the first flat electrode has exactly one first connection and exactly one second connection or the second flat electrode has exactly one first connection and exactly one second connection.

16. The laminated pane arrangement according to claim 15, wherein the first and second connection of the first flat electrode are arranged opposite one another in a plane of the first flat electrode, or the first and second connection of the second flat electrode are arranged opposite one another in a plane of the second flat electrode.

17. The laminated pane arrangement according to claim 16, wherein a distance between the first and second connection of the first flat electrode is equal to a distance between the first and second connection of the second flat electrode.

* * * * *

UNITED STATES PATENT AND TRADEMARK OFFICE
CERTIFICATE OF CORRECTION

PATENT NO. : 11,415,855 B2
APPLICATION NO. : 17/424773
DATED : August 16, 2022
INVENTOR(S) : Stefan Droste et al.

It is certified that error appears in the above-identified patent and that said Letters Patent is hereby corrected as shown below:

In the Claims

In Claim 1 at Column 16, Line 33 should read as follows:
1. A laminated pane arrangement, comprising:
    a laminated pane with an outer pane and an inner pane that are joined to one another via a thermoplastic intermediate layer, wherein a functional element is embedded in the thermoplastic intermediate layer, which functional element includes an active layer based on liquid crystals, whose optical properties are controllable by a first flat electrode and a second flat electrode, wherein the first flat electrode has a first and a second connection, and wherein the second flat electrode has a first and a second connection,
    a first circuit, which has a first voltage source with a first and second voltage output for providing a first AC voltage,
    a second circuit, which has a second voltage source with a first and second voltage output for providing a second AC voltage, wherein a maximum voltage of the second AC voltage is greater than a maximum voltage of the first AC voltage and the first and second AC voltages have the same frequency,
wherein the first voltage output of the first voltage source is electrically conductively connected only to the first connection of the first flat electrode and the second voltage output of the first voltage source is electrically conductively connected only to the first connection of the second flat electrode, and
wherein the first voltage output of the second voltage source is electrically conductively connected only to the second connection of the first flat electrode and the second voltage output of the second voltage source is electrically conductively connected only to the second connection of the second flat electrode.

Signed and Sealed this
Thirteenth Day of December, 2022

Katherine Kelly Vidal
*Director of the United States Patent and Trademark Office*